April 29, 1930.  R. M. GILSON  1,756,589
ELECTRICAL APPARATUS
Filed Jan. 31, 1929
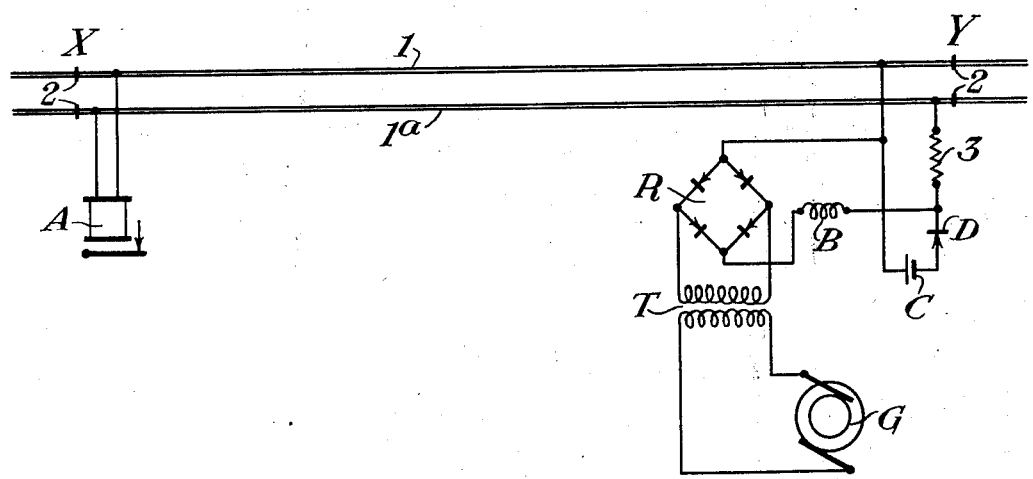
INVENTOR:
R. M. Gilson,
by A. L. Verrill
His Attorney Patented Apr. 29, 1930

1,756,589

UNITED STATES PATENT OFFICE

ROBERT M. GILSON, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL APPARATUS

Application filed January 31, 1929. Serial No. 336,584.

My invention relates to electrical apparatus, and particularly to apparatus of the type involving a direct current load, a source of alternating current connected with the load through a rectifier, and a reserve source of direct current for the operation of said load in the event of failure of current from the rectifier.

One feature of my invention is the provision, in a combination of this character, of means for connecting the reserve source with the load in such manner that this source normally furnishes substantially no current to the load and receives no current from the rectifier, but will automatically furnish current to the load, without the operation of any moving parts, in the event of failure of the supply of current by the rectifier.

I will describe one form of apparatus embodying my invention, and will then point out the novel features thereof in claims.

The accompanying drawing is a diagrammatic view showing one form of apparatus embodying my invention.

Referring to the drawing, the reference characters 1 and 1ª designate the track rails of a railway, which rails are divided by insulated joints 2 to form a block section X—Y. Connected across the rails of this section is a track relay A of the direct current type. This relay, in the form of my invention herein illustrated, constitutes the load which is to be supplied with direct current.

The reference character T designates a transformer, the primary of which is constantly supplied with alternating current from a suitable source, such as a generator G. The secondary of transformer T is connected with the input terminals of a full wave rectifier R. The output terminals of this rectifier are connected with the track rails 1 and 1ª respectively, of the track section X—Y, through a smoothing reactance B and a current limiting resistance 3. The generator G, transformer T and rectifier R constitute the normal source of direct current for the operation of track relay A.

The reference character C designates a reserve source of direct current which will usually be a primary battery. This battery is connected across the track rails 1 and 1ª through the current limiting resistance 3, and an asymmetric unit D is connected in series with the battery C in such direction as to prevent the output current from the rectifier R from flowing through the battery. That is to say, it is assumed that the right-hand terminal of battery C is positive, and that the lower output terminal of rectifier R is likewise positive. It will be seen, therefore, that the output current from rectifier R cannot flow through battery C because of the opposition offered by the asymmetric unit D, but it will also be seen that current from battery C may flow through this unit D and into the track circuit comprising the track rails 1 and 1ª and the track relay A.

The voltage of battery C is preferably lower than the output voltage of rectifier R, and when adjusted in this manner practically all of the track circuit load will be furnished by the generator G unless the output current of rectifier R fails; in the event of such failure the track circuit load will be supplied by battery C. I have found that the output of rectifier R may be adjusted to such value as to carry the maximum track circuit load under wet weather conditions or occupied track circuit conditions, and that the voltage of this output will always be higher than the voltage of the battery C, so that as long as the normal source of energy is available there will be substantially no drain on the battery C.

One important feature of my invention is that no moving parts are required to transfer the load from the rectifier R to the battery C. Another important feature is the fact that substantially no current is drawn from the battery C as long as the normal source of energy is furnishing current to the load. Still another important feature is the fact that none of the output current from rectifier R can flow through battery C to damage this battery.

Although I have herein shown and described only one form of electrical apparatus embodying my invention, it is understood that various changes and modifications may be made therein within the scope of the appended claims without departing from the spirit and scope of my invention.

Having thus described my invention, what I claim is:

1. In combination, a source of alternating current, a direct current load, a rectifier interposed between said source and said load, a reserve source of direct current also connected with said load, and an asymmetric unit connected in series with said reserve source in such direction as to prevent the output current from said rectifier from flowing through said reserve source.

2. In combination, a source of alternating current, a direct current load, a rectifier interposed between said source and said load, a reserve source of direct current also connected with said load, and an asymmetric unit connected in series with said reserve source in such direction as to prevent the output current from said rectifier from flowing through said reserve source, the voltage of said reserve source being lower than the output voltage of said rectifier so that the reserve source furnishes substantially no current to the load unless the output of said rectifier fails.

3. In combination, with the track rails of a railway track, a track relay connected with said rails, a source of alternating current, a rectifier interposed between said source and said rails, a reserve source of direct current connected with said rails, and an asymmetric unit connected in series with said reserve source in such direction as to prevent the output current from said rectifier from flowing through the reserve source.

4. In combination with the track rails of a railway track, a track relay connected with said rails, a source of alternating current, a rectifier interposed between said source and said rails, a reserve source of direct current connected with said rails, and an asymmetric unit connected in series with said reserve source in such direction as to prevent the output current from said rectifier from flowing through the reserve source, the voltage of said reserve source being lower than the output voltage of said rectifier so that the reserve source furnishes substantially no current to the track rails unless the output of the rectifier fails.

In testimony whereof I affix my signature.

ROBERT M. GILSON.